(12) United States Patent
Takahashi et al.

(10) Patent No.: US 10,417,214 B2
(45) Date of Patent: Sep. 17, 2019

(54) NON-TRANSITORY COMPUTER-READABLE STORAGE MEDIUM, DATABASE CONTROL METHOD AND DATABASE CONTROL DEVICE

(71) Applicant: FUJITSU LIMITED, Kawasaki-shi, Kanagawa (JP)

(72) Inventors: Kouji Takahashi, Yokohama (JP); Kiichi Yamada, Numazu (JP); Masahiko Nagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 307 days.

(21) Appl. No.: 15/246,886

(22) Filed: Aug. 25, 2016

(65) Prior Publication Data

US 2017/0068701 A1 Mar. 9, 2017

(30) Foreign Application Priority Data

Sep. 7, 2015 (JP) .................................. 2015-176111

(51) Int. Cl.
*G06F 17/30* (2006.01)
*G06F 16/23* (2019.01)

(52) U.S. Cl.
CPC ................................ *G06F 16/2336* (2019.01)

(58) Field of Classification Search
CPC ............................................... G06F 17/30359
See application file for complete search history.

(56) References Cited

U.S. PATENT DOCUMENTS

| 5,371,886 | A | 12/1994 | Britton et al. |
| 5,950,212 | A * | 9/1999 | Anderson ........... G06F 16/2379 |
| 6,502,122 | B1 | 12/2002 | Takeuchi |
| 2004/0139116 | A1 * | 7/2004 | Porter ............... G06F 17/30345 |
| 2009/0287703 | A1 | 11/2009 | Furuya |
| 2012/0191679 | A1 | 7/2012 | Takebe |

FOREIGN PATENT DOCUMENTS

| JP | 4-230541 | 8/1992 |
| JP | 11-85544 | 3/1999 |
| JP | 2009-271665 | 11/2009 |
| JP | 2012-155498 | 8/2012 |

* cited by examiner

*Primary Examiner* — Syed H Hasan
(74) *Attorney, Agent, or Firm* — Staas & Halsey LLP

(57) ABSTRACT

A non-transitory computer-readable storage medium storing a database control program that causes a computer to execute a process, the process including when an update processing for a value of a data item included in a record stored in a database occurs, generating a first record and a second record, the first record including the data item having a value updated by the update processing, the second record including the data item having a value not updated by the update processing, and when a new update processing occurs for the record for which the update processing occurred, performing the new update processing for both of the first record and the second record.

9 Claims, 12 Drawing Sheets

FIG. 6A

| RECORD NO. | ITEM NAME | THE NUMBER OF PIECES | TxID | STATE |
|---|---|---|---|---|
| 1 | ONION | 100 | Tx10 | THE LATEST COMMITTED |
| 2 | ONION | 150 | Tx11 | UNCOMMITTED |
| 3 | ONION | 70 | Tx12 | UNCOMMITTED |
| 4 | ONION | 120 | Tx12 | UNCOMMITTED |

(1) ← row 2
(2) { rows 3, 4

FIG. 6B

| RECORD NO. | ITEM NAME | THE NUMBER OF PIECES | TxID | STATE |
|---|---|---|---|---|
| 1 | ONION | 100 | Tx10 | OLD COMMITTED |
| ~~2~~ | ~~ONION~~ | ~~150~~ | ~~Tx11~~ | ~~RECORD DELETED~~ |
| 3 | ONION | 70 | Tx12 | THE LATEST COMMITTED |
| 4 | ONION | 120 | Tx12 | UNCOMMITTED |

FIG. 6C

| RECORD NO. | ITEM NAME | THE NUMBER OF PIECES | TxID | STATE |
|---|---|---|---|---|
| 1 | ONION | 100 | Tx10 | OLD COMMITTED |
| 3 | ONION | 70 | Tx12 | OLD COMMITTED |
| 4 | ONION | 120 | Tx12 | THE LATEST COMMITTED |

NON-TRANSITORY COMPUTER-READABLE STORAGE MEDIUM, DATABASE CONTROL METHOD AND DATABASE CONTROL DEVICE

CROSS-REFERENCE TO RELATED APPLICATION

This application is based upon and claims the benefit of priority of the prior Japanese Patent Application No. 2015-176111, filed on Sep. 7, 2015, the entire contents of which are incorporated herein by reference.

FIELD

The embodiments discussed herein are related to a non-transitory computer-readable storage medium, a database control method, and a database control device.

BACKGROUND

When accesses occur from a plurality of transactions to a database at the same time, data consistency in the database is guaranteed by performing exclusive control. At this time, until one of conflicting transactions has committed or rolled back data update, the other of the transactions is placed in a waiting state. That is to say, in exclusive control, it is not possible to execute a plurality of transactions in parallel, and thus the processing efficiency of transactions deteriorates. On the other hand, techniques for executing conflicting transactions in parallel are known (for example, refer to Japanese Laid-open Patent Publication No. 11-85544 and Japanese Laid-open Patent Publication No. 2012-155498).

Also, in update processing of a database, Multi-Version Concurrency Control (MVCC) is known as a technique for executing online processing and batch processing in parallel. In MVCC, while a record before an update is stored in the database, a record after the update is added in the database as a new record so that a plurality of new version records and old version records are managed. Thereby, it is possible to perform online processing that updates a relatively small amount of records and batch processing that updates a relatively large amount of records in parallel.

SUMMARY

According to an aspect of the invention, a non-transitory computer-readable storage medium storing a database control program that causes a computer to execute a process, the process including when an update processing for a value of a data item included in a record stored in a database occurs, generating a first record and a second record, the first record including the data item having a value updated by the update processing, the second record including the data item having a value not updated by the update processing, and when a new update processing occurs for the record for which the update processing occurred, performing the new update processing for both of the first record and the second record.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A, 6B, and 6C are diagrams illustrating an example of records to be stored in a database according to an embodiment;

DESCRIPTION OF EMBODIMENTS

However, only one record exists as the latest record of data in a database after all. Accordingly, if a plurality of transactions attempt to update the latest record, it is not possible to perform the update processing at the same time, and exclusive control has to be performed. For example, if update processing that updates the latest record occurs at the same time in both online processing and batch processing that are executed in parallel, unless update processing of one of the online processing and the batch processing is completed, the lock is not released, and thus the other update processing is not allowed to be executed. Accordingly, a waiting time of the other update processing occurs until the lock is released, and thus there is a problem in that the processing efficiency deteriorates.

Thus, according to an embodiment of the present disclosure, it is desirable to shorten a waiting time of update processing.

Following, a description will be given of the embodiments of the present disclosure with reference to the accompanying drawings. In this regard, in this specification and the drawings, the same symbol is given to a component having a substantially identical functional configuration, and thereby duplicated description will be omitted.

Database Update Processing

There is a method in which update processing to a database is divided into online processing and batch processing, and each processing is performed depending on a time period. For example, online processing is performed during the daytime and batch processing is performed at night. However, with the progress of 24-hour services, globalization, and an increase in speed, the demand for executing online processing and batch processing in parallel is increasing. Thus, MVCC is known as a technique that makes it possible to execute online processing and batch processing in parallel.

MVCC

A brief description will be given of Multi-Version Concurrency Control (MVCC) with reference to FIGS. 1A, 1B, 1C, 1D, and 1E. FIGS. 1A, 1B, 1C, 1D, and 1E illustrates examples of records stored in a database. In MVCC, while a record before an update is stored in a database, a record after the update is added to the same database as a new record.

Figure 1:
FIGS. 1A, 1B, 1C, 1D, and 1E are diagrams illustrating examples of records stored in a database.

For example, as illustrated in FIG. 1A, it is assumed that a record having the record number "No. 1" is stored in a database by update processing of a transaction program (hereinafter also referred to as a "transaction") Tx100 that receives 10 carrots. At this time, carrot, 10, Tx100, and information as to whether valid or not are stored in respective items of the record number "No. 1", namely, an item name, the number of items, an addition transaction (Tx) ID, and a record state, respectively.

Next, a record having the record number "No. 2", illustrated in FIG. 1B, is stored in the database by update processing by a transaction Tx101 that receives 4 onions. Next, a record having the record number "No. 3", illustrated in FIG. 1C, is stored in the database by update processing by a transaction Tx105 that adds 4 onions. The number of onions in the record having the record number "No. 3" becomes 8. At this time, while the record having the record number before update "No. 2" is stored in the database, the record having the record number after update "No. 3" is newly stored. The transaction Tx105 is stored in the transaction (Tx) ID that has performed deletion in the record having the record number "No. 2", and the state of the record having the record number "No. 2" becomes invalid.

Next, as illustrated in FIG. 1D, a record that has the record number "No. 4" and records receipt of 2 mushrooms is stored in the database by update processing by a transaction Tx110 that receives 2 mushrooms and deletes onions from the item. Also, by deleting onions from the item, the transaction Tx110 is stored in the transaction (Tx) ID that has deleted the record having the record number "No. 3", and the state of the record having the record number "No. 3" becomes invalid.

For example, when transaction processing is executed in ascending order of the transaction number, an example of the views of the records from the other transactions Tx90, Tx106, and Tx120 is illustrated in FIG. 1E. FIG. 1E illustrates how each of the records stored in the database is viewed from each of the transactions Tx90, Tx106, and Tx120.

The transaction Tx90 is executed earlier than the transaction Tx100, and thus the records having the record number "No. 1" to "No. 4" do not exist in the database as viewed from the transaction Tx90. The transaction Tx106 is executed between the transaction Tx105 and the transaction Tx110. Accordingly, the transaction Tx106 is allowed to view the records having the valid record numbers "No. 1" and "No. 3" illustrated in FIG. 1C, and is not allowed to view the record having the invalid record number "No. 2" illustrated in FIG. 1C. Also, the record having the record number "No. 4" illustrated in FIG. 1D does not exist at this time.

The transaction Tx120 is executed after the transaction Tx110. Accordingly, the transaction Tx120 is allowed to view the records having the valid record numbers "No. 1" and "No. 4" illustrated in FIG. 1D, and is not allowed to view the records having the invalid record numbers "No. 2" and "No. 3" illustrated in FIG. 1D.

Locking at the Time of Updating Record

In the MVCC described above, both the new version and the old version records are stored in the database. However, only one record exists as the latest record of one piece of data. Accordingly, if a plurality of transactions attempt to update the latest record, it is not possible to perform the update processing at the same time, and exclusive control has to be performed.

For example, a description will be given of locking at the time when two kinds of transactions update records with reference to FIG. 2. Transactions of online processing are denoted by To1 to To3, a transaction of batch processing is denoted by Tb1.

The transactions To1 to To3 of online processing update a few records. As an example of online processing, shipment processing is given. A large number of transactions of online processing sometimes operate at the same time. On the other hand, the transaction Tb1 of batch processing updates a large number of records. As an example of batch processing, reception processing is given. The number of transactions of batch processing that operate at the same time is smaller than the number of transactions of online processing.

For example, in the case of updating a record stored in the same database, during execution of a preceding transaction, a succeeding transaction is placed in a lock wait, and the processing time of the succeeding transaction extends. That is to say, there is a problem in that it is not possible to perform update processing of the succeeding transaction until the lock is released, and thus there is a waiting time, and the processing efficiency deteriorates.

Figure 2:
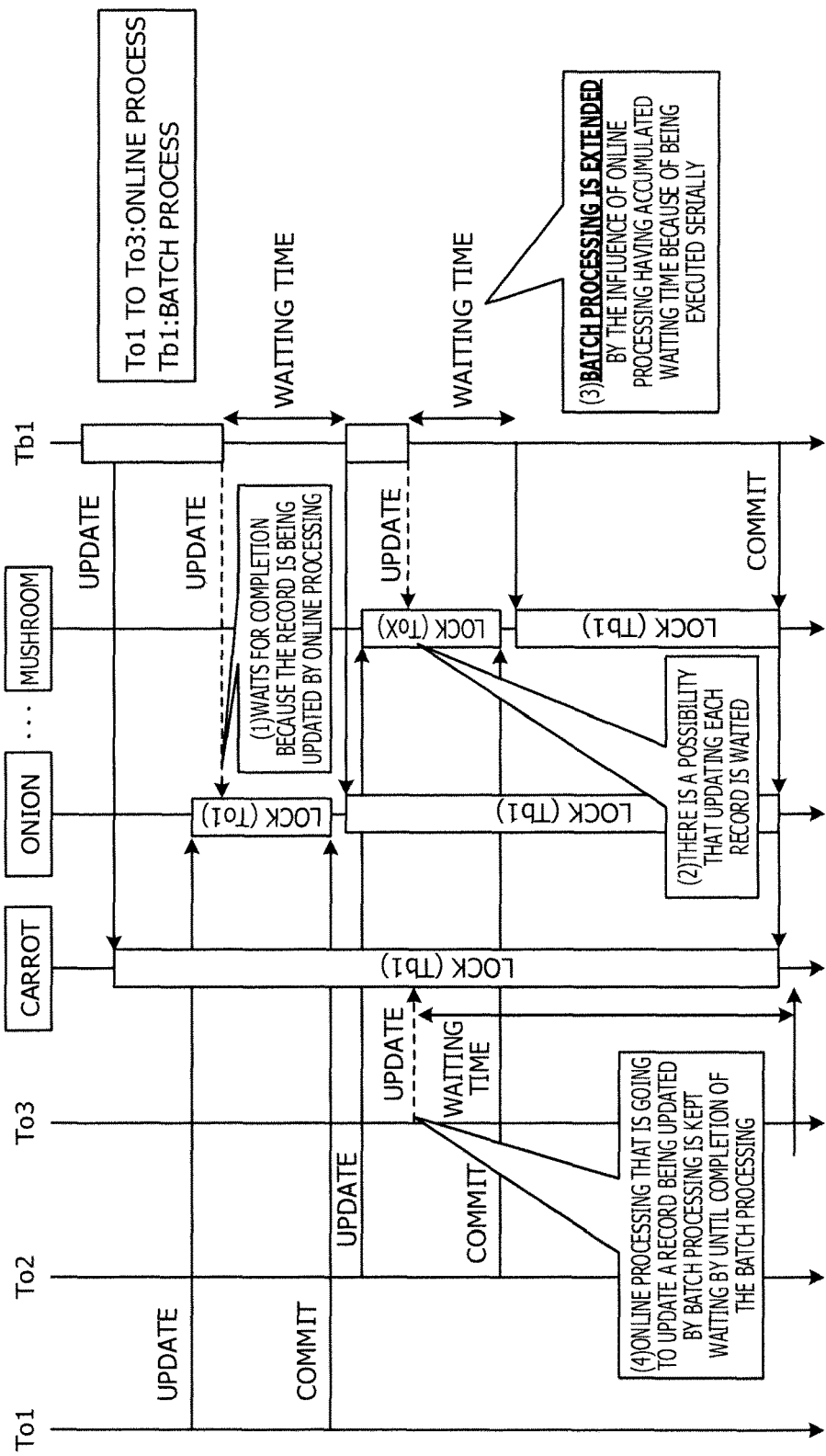
FIG. 2 is a diagram for explaining an example of lock at the time of updating records.

The horizontal axis FIG. 2 represents each of the transactions To1 to To3, Tb1 and the lock state of each record, and the vertical axis represents time that passes from top to bottom. Specifically, the batch processing Tb1 locks a record of carrot in order to update the record, and then the online processing To1 locks a record of onion in order to update the record. After that, when the batch processing Tb1 update the record of onion, as illustrated by (1) in FIG. 2, since the online processing To1 is updating, the record of onion is locked. Accordingly, there is a waiting time in the batch processing Tb1 until the lock is released. When the online processing To1 completes (commits) the update of the record of onion, the batch processing Tb1 locks the record of onion.

Next, the online processing To2 locks a record of mushroom in order to update the record of mushroom. Next, when the batch processing Tb1 updates the record of mushroom, as illustrated by (2) in FIG. 2, since the online processing To2 is updating, there is a waiting time in the batch processing Tb1 until the lock of the record of mushroom is released. As a result, as illustrated by (3) in FIG. 2, it is not possible to update the same record at the same time, and thus update processing of the same record is performed serially. Thereby a waiting time in the batch processing Tb1 increases. In this manner, the processing time of the batch processing Tb1 extends in accordance with the state of the online processing To1 and To2. In the same manner, as illustrated by (4) in FIG. 2, the online processing To3 that attempts to update the record in the process of being updated by the batch processing Tb1 is kept waiting until the update processing of the batch processing Tb1 is completed.

In this manner, in update processing of a database, there is the MVCC technique that executes online processing and batch processing in parallel. However, since only one record exists as the latest record, it is not possible for a plurality of transactions to update the same record at the same time. When a certain record is updated, the record is locked in order for the record not to be updated by the other transactions. The lock is released at the time of completion of the transaction, that is to say, when the transaction is committed. Accordingly, it is not possible to execute the succeeding batch processing without waiting for commitment of the transaction in the preceding online processing. In the same manner, it is not possible to execute the succeeding online processing without waiting for commitment of the transaction in the preceding batch processing.

Thus, in a database control method according to the present embodiment described below, a plurality of transactions update the same record in parallel and at the same time. Thereby, it is possible to reduce a waiting time that occurs in the succeeding transaction until the preceding transaction commits or rolls back. As a result, it is possible to shorten the execution time of update processing of the transactions.

In this regard, commit refers to determination of update processing, and rollback refers to bringing back to the one state before the update processing without committing the update processing.

Functional Configuration of Database Server

Figure 3:
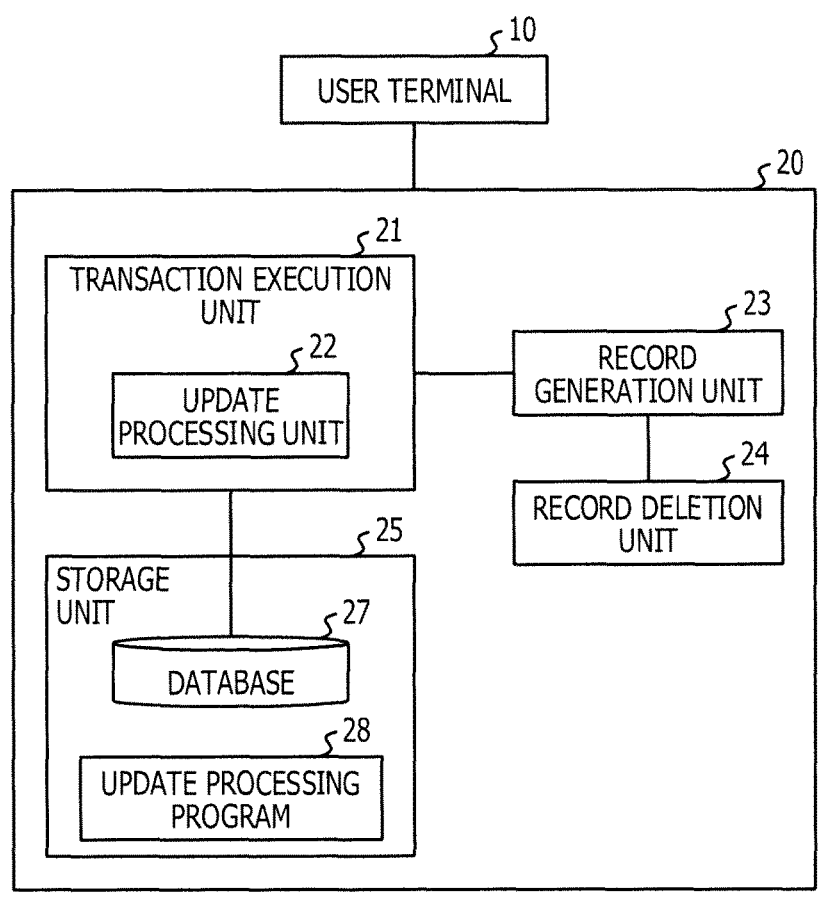
FIG. 3 is a diagram illustrating an example of a functional configuration of a database server according to an embodiment.

First, a description will be given of an example of a functional configuration of a database server 20 according to an embodiment of the present disclosure with reference to FIG. 3. The database server 20 according to the present embodiment is coupled to a user terminal 10 via a network, and receives transactions that execute processing, such as search, update, deletion, and the like of data stored in a database 27. The database server 20 is an example of a database control device.

The database server 20 includes a transaction execution unit 21, a record generation unit 23, a record deletion unit 24, and a storage unit 25. The transaction execution unit 21 executes various kinds of transaction processing, such as search, update, deletion, and the like of the data in the database 27 stored in the storage unit 25. Among the transaction processing executed by the transaction execution unit 21, update processing is executed by an update processing unit 22.

Specifically, if new update processing is performed on a record that has been subjected to update processing, the update processing unit 22 performs new update processing on each of the record including an item value having a numeric value in the case of having been updated and the record including an item value having a numeric value in the case of not having been updated.

A description will be given of the case where update processing has been performed on an item value of a data item included in a record stored in the database 27. In this case, the record generation unit 23 generates both of the record including an item value having a numeric value when the item value is updated by the update processing, and the record including the item value having a numeric value when the item value is not updated by the update processing.

The record deletion unit 24 deletes a record including an item value of the data item that no longer exists at the point in time when any update processing (including new update processing) is committed or rolled back.

The storage unit 25 stores predetermined data in the database 27. FIGS. 6A, 6B, and 6C illustrate an example of a data structure of the database 27. The database 27 includes each data item, namely a record number 271, an item name 272, the number of items 273, a transaction ID 274 and a state 275 of a record. In the present embodiment, by executing the transactions of reception processing and shipment processing, the number of items 273, which is an item value of a numeric value, is updated.

An update processing program 28 for updating data in the database 27, and the like is installed in the storage unit 25. The update processing program 28 is installed so that the database server 20 executes various kinds of transaction processing, such as search, update, deletion, and the like of data in the database 27, which are requested by the user terminal 10.

Database Control Processing

Next, a description will be given of update processing during database control processing according to the present embodiment with reference to a flowchart in FIG. 4. When the transaction execution unit 21 receives a transaction that performs data search, or the like on the database 27 from the user terminal 10, the transaction execution unit 21 searches for predetermined data. The update processing unit 22 in the transaction execution unit 21 executes update processing of data, which is executed in the transaction.

Figure 4:
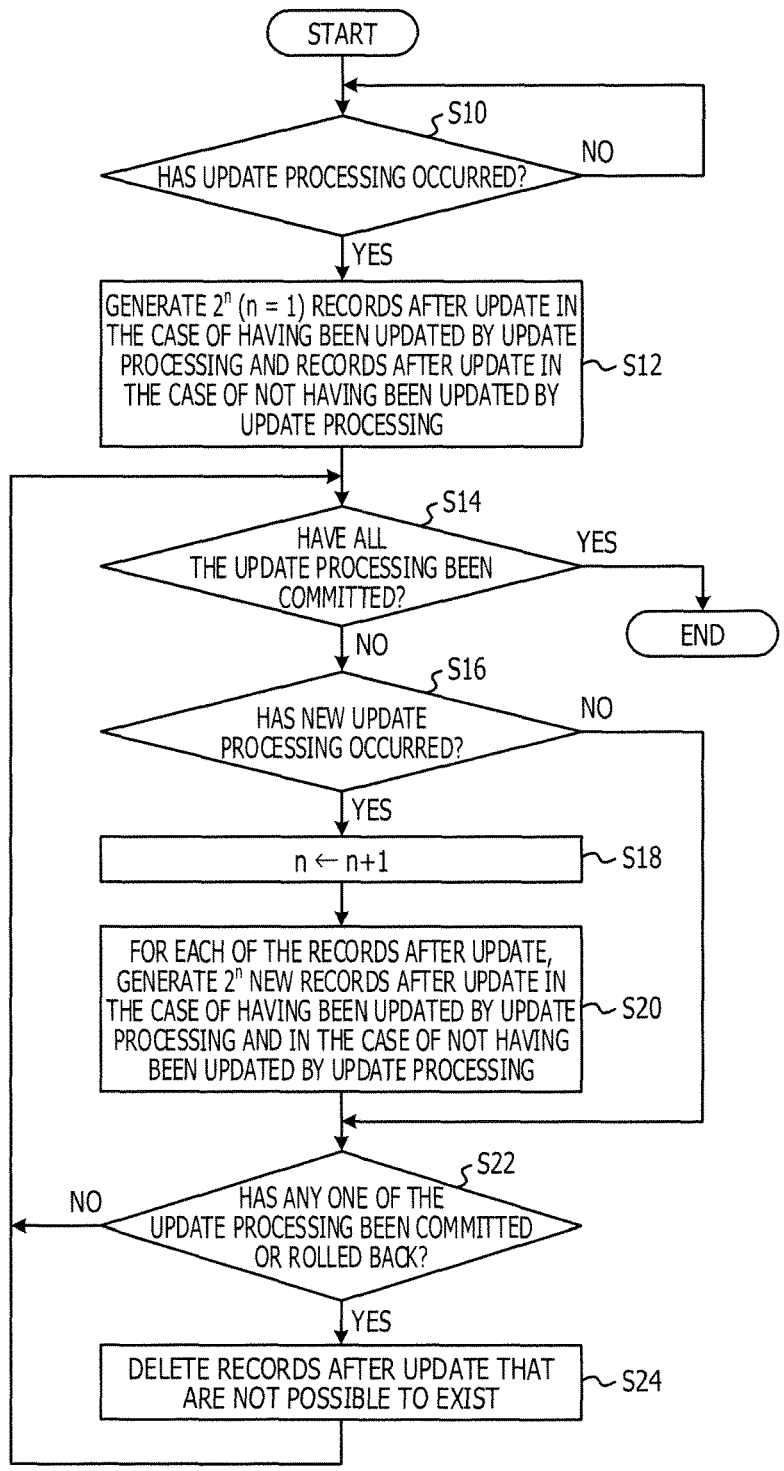
FIG. 4 is a flowchart illustrating an example of update processing according to an embodiment.

When the execution of update processing in FIG. 4 is started, the update processing unit 22 in the transaction execution unit 21 determines whether or not update processing of the database 27 has occurred (step S10). The update processing unit 22 waits for the occurrence of update processing of the database 27. If update processing has occurred, the update processing unit 22 generates $2^n$ (n=1) pieces (here, 2 pieces) of records after the update, which are the sum of records after the update in the case of having been updated by the update processing and records after the update in the case of not having been updated by the update processing (step S12).

Figure 5:
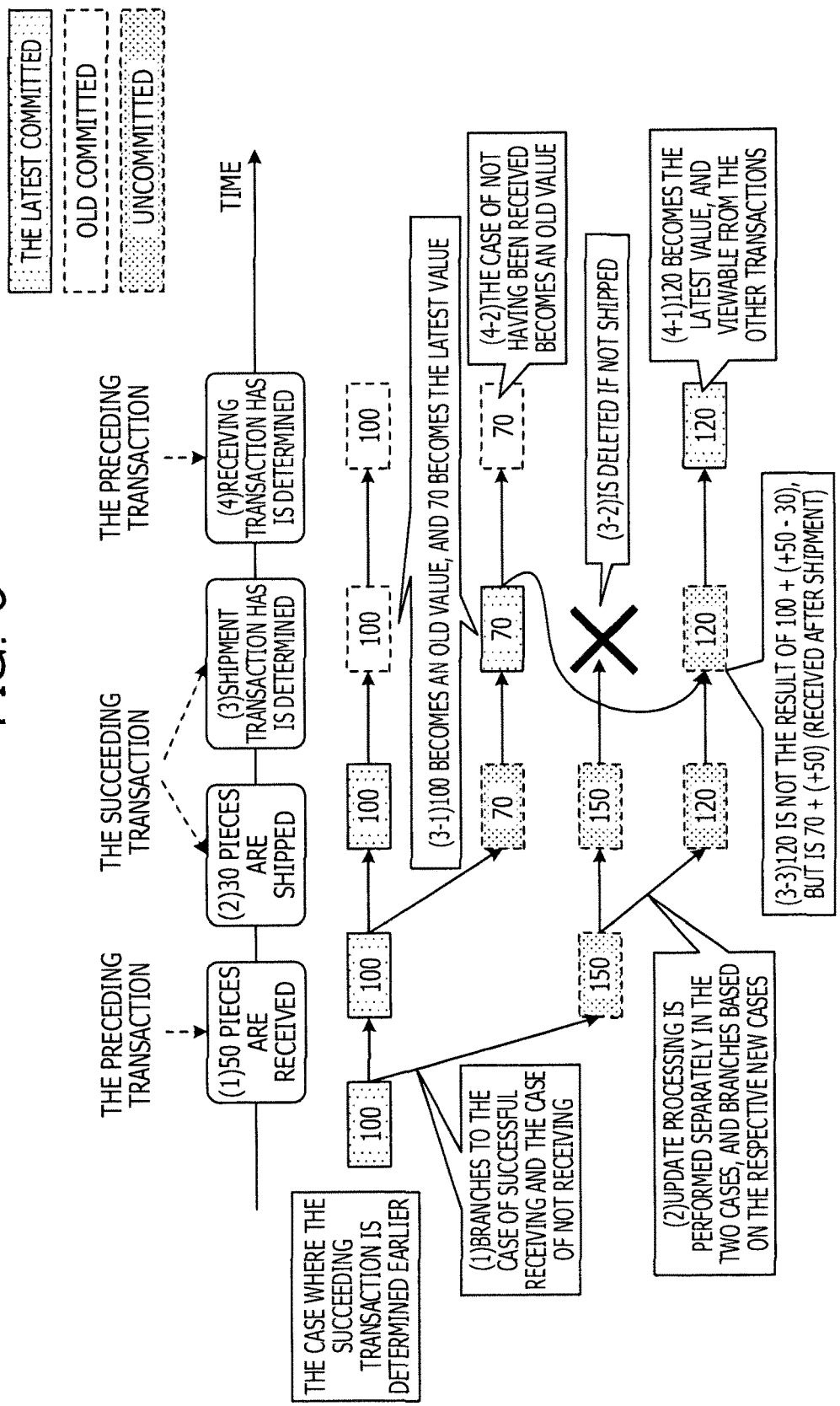
FIG. 5 is a diagram illustrating an example of record states during update processing according to an embodiment.

For example, FIG. 5 illustrates an example of records stored in the database 27 in the case where the transactions of the following pattern 1-1 occurred in sequence. Time passes from the left side to the right side of the paper surface in FIG. 5, and transition of a numeric value of each record with time is illustrated.

Pattern 1-1

The preceding transaction: reception processing (batch processing)

The succeeding transaction: shipment processing (online processing) in the case where the succeeding transaction is committed (determined) earlier than the preceding transaction (1) The preceding transaction is executed so that 50 pieces are received (2) The succeeding transaction is executed so that 30 pieces are shipped (3) The shipment processing of the succeeding transaction is committed (determined)

(4) The reception processing of the preceding transaction is committed (determined)

It is assumed that (1) update processing of the preceding transaction has occurred in step S10 in FIG. 4. In this case, in step S12, all the records of the update processing that are considered at this point in time are generated. Here, the cases of having succeeded in the reception processing of (1) and failed in the processing are all of the update processing operations considered at this point in time. Accordingly, after (1) the preceding transaction is executed, the record that stores 150 in the case where the reception processing has succeeded and the record that stores 100 in the case where the reception processing has failed are stored in the database 27.

That is to say, it is assumed that before (1) the preceding transaction is executed, as illustrated in FIG. 6A, a record (hereinafter also referred to as "record 1") having the record number 271 of "No. 1" is stored in the database 27.

As illustrated by (1) in FIG. 6A, after the preceding transaction Tx11 is executed, a record (hereinafter also referred to as "record 2") having a record number 271 of "No. 2" in the case where the reception processing of (1) has succeeded is added to the database 27. The data items of the record 2 store an item name 272 of "onion", the number of items 273 of "150", a transaction ID 274 of "Tx11", a state 275 of "uncommitted". Also, the record having the record number 271 of "No. 1" in the case where the reception processing of (1) has failed is stored in the database 27 without change.

Referring back to FIG. 4, next, the update processing unit 22 determines whether or not all the update processing have been committed (step S14). If all the update processing have been committed, this processing is terminated. At this point in time, the update processing of the preceding transaction has not been committed. Accordingly, the processing of the update processing unit 22 proceeds to step S16, and a determination is made as to whether or not new update processing has occurred (step S16).

If the update processing unit 22 determines that new update processing has not occurred, the processing proceeds to step S22. If the update processing unit 22 determines that new update processing has occurred, "1" is added to n (step S18). Next, for each of the records after an update (records of "100" and "150" in FIG. 5), the update processing unit 22 generates $2^n$ (=4) pieces of records after an update including the records after an update in the case of having been updated by the new update processing, and the records after an update in the case of not having been updated (step S20).

In step S16 in FIG. 4, it is assumed that update processing of the succeeding transaction has occurred as illustrated by (2) in FIG. 5. In this case, in step S20, a combination of 4 types of update processing including each of the cases where the reception processing of (1) has succeeded and failed, and each of the cases where the shipment processing of (2) has succeeded and failed are all the update processing operations considered at this point in time.

Accordingly, after (2) the succeeding transaction is executed, the following 4 records are stored in the database 27.

The record storing 120 pieces in the case where (1) the reception processing has succeeded and (2) the shipment processing has succeeded.

The record storing 150 pieces in the case where (1) the reception processing has succeeded and (2) the shipment processing has failed.

The record storing 70 pieces in the case where (1) the reception processing has failed and (2) the shipment processing has succeeded.

The record storing 100 pieces in the case where (1) the reception processing has failed and (2) the shipment processing has failed.

That is to say, as illustrated by (2) in FIG. 6A, after the succeeding transaction Tx12 of (2), the record (record 3) having the record number 271 "No. 3" and the record (record 4) having the record number 271 "No. 4" are added to the database 27. The item name 272 of "onion", the number of items 273 of "70", the transaction ID 274 of "Tx12", and the state 275 of "uncommitted" are stored in the data items of the record 3, respectively. The item name 272 of "onion", the number of items 273 of "120", the transaction ID 274 of "Tx12", and the state 275 of "uncommitted" are stored in the data items of the record 4, respectively.

Referring back to FIG. 4, next, the update processing unit 22 determines whether any one of the update processing operations has been committed or rolled back (step S22). In the case of FIG. 5, the update processing unit 22 determines whether update processing of the preceding transaction of (1) or update processing of the succeeding transaction of (2) has been committed or rolled back. If the update processing unit 22 determines that none of the update processing has been committed or rolled back, the processing returns to step S14, and the processing of step S14 and thereafter is repeated.

On the other hand, if the update processing unit 22 determines that any one of the update processing operations has been committed or rolled back, the update processing unit 22 deletes the records after the update that no longer exist (step S24), and after that, the processing returns to step S14, and the processing of step S14 and thereafter is repeated.

By (3) in FIG. 5, the shipment processing of the succeeding transaction is committed. In this case, the record storing "150" in the case (3-2) of not having been shipped is a record after the update that no longer exists, and thus this record is deleted. Also, as illustrated by (3-1), the record indicated by "100" becomes the old record that has been committed, and the record indicated by "70" becomes the latest record that has been committed. Further, as illustrated by (3-3), the record indicated by "120" does not become (120=100+50−30), which indicates the shipment after the receiving, but becomes (120=100−30+50=70+50), which indicates an uncommitted record having been received after the shipment.

As a result, at this point in time, as illustrated in FIG. 6B, after the succeeding transaction Tx12 is committed, which is described in (3), the record 2 is deleted from the database 27. As a result, three records, that is to say, the record 1 having the state 275 of "old committed record", the record 3 having the state 275 of "the latest committed record", and the record 4 having the state 275 of "uncommitted record" are stored.

Referring back to FIG. 4, next, the processing returns to step S14, and the update processing unit 22 determines whether or not all the update processing operations have been committed. At this point in time, the reception processing of the preceding transaction, which is described in (4), has not yet been committed. Accordingly, the processing proceeds to step S16, and the update processing unit 22 determines whether or not new update processing has occurred. At this point in time, new update processing has not yet occurred. Thus, the processing proceeds to step S22, and the update processing unit 22 determines whether or not any one of the update processing has been committed or rolled back (step S22). In the case of FIG. 5, the update processing unit 22 of (3) the succeeding transaction is committed, and then the update processing of (4) the preceding transaction is committed. At this time, the update processing unit 22 deletes the records after the update that no longer exist (step S24). Here, there are no records after the update that are to be deleted.

As illustrated in FIG. 5, when (4) the update processing of the preceding transaction is committed, the record 4 of "120", which is indicated by (4-1) in FIG. 5, is determined as the latest record having the latest committed value of "120". Thereby, the latest record having "120" becomes possible to be referred from the other transactions. The record 3 of "70" indicated by (4-2) in FIG. 5 then becomes "old committed". At this point in time, as illustrated in FIG. 6C, after (4) the preceding transaction Tx11 has been committed, three records, that is to say, the record 1 and the record 3 having the state 275 of "old committed", and the record 4 having the state 275 of "the latest committed" are stored.

Referring back to FIG. 4, the processing returns to step S14, and at this point in time, the update processing unit 22 determines that all the update processing have been committed, and this processing is terminated.

As described above, with the database control method according to the present embodiment, regarding concurrent execution of database transactions, it is possible to particularly perform update processing of a plurality of transactions to the same resource at the same time. That is to say, it is possible to perform update processing to the same data at the same time without one transaction waiting completion of update processing of the other transactions. Thereby, in the update processing of a database, it is possible to execute online processing and batch processing at the same time.

Specifically, in the present embodiment, in the case where before a certain transaction is committed, the processing of another transaction is executed, all the records of the update processing, which are considered at that point in time, are generated. Thereby, in the update processing of the database 27, it is possible to perform update processing of a plurality of transactions (for example, online processing and batch processing) at the same time. As a result, it is possible to shorten a waiting time of a plurality of transactions processing.

Also, in the present embodiment, the records that are not possible to exist at the point in time when each transaction has been committed are deleted. Thereby, unwanted records are deleted from the database 27 so that it is possible to effectively use common resources that are accessible from a plurality of transactions.

In the pattern 1-1 described above, a description has been given of the records that are stored in the database 27 in the case where the succeeding transaction is committed earlier than the preceding transaction. Next, a description will be given of a pattern 1-2 in the case where the preceding transaction is committed earlier than the succeeding transaction with reference to FIG. 7.

Pattern 1-2

In the pattern 1-2, transactions are processed by the following procedure.
(1) The preceding transaction is executed so that 50 pieces are received
(2) The succeeding transaction is executed so that 30 pieces are shipped
(3) The reception processing of the preceding transaction is committed
(4) The shipment processing of the succeeding transaction is committed In this case, when update processing according to the present embodiment in FIG. 4 is executed, if (3) the processing of the preceding transaction is committed, the record having "70" in the case of not having been shipped, which is illustrated by (3-2) in FIG. 7, is a record after the update that no longer exists, and thus is deleted.

Figure 7:
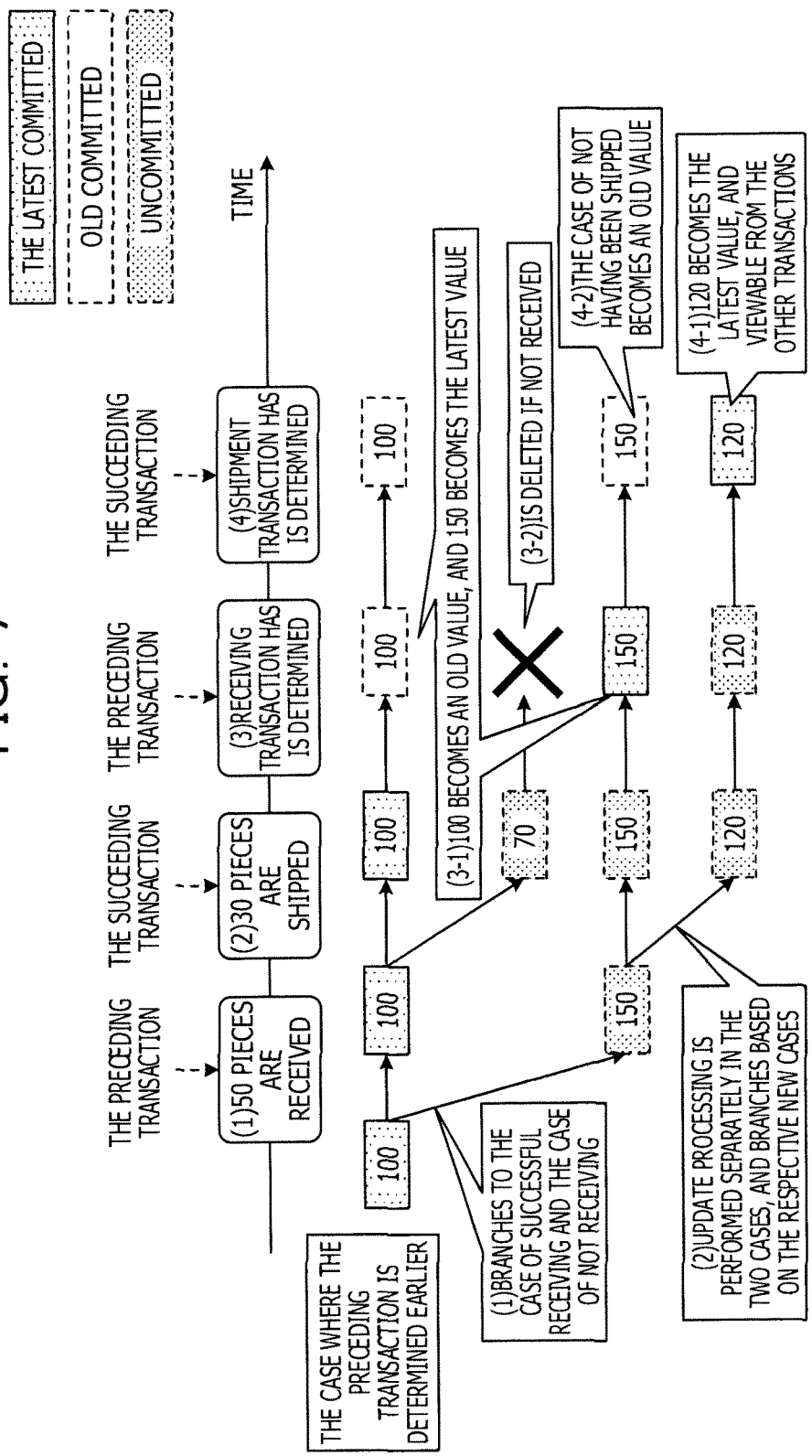
FIG. 7 is a diagram illustrating another example of record states during update processing according to an embodiment.

When (4) the processing of the succeeding transaction is committed, the record of "120", which is indicated by (4-1) in FIG. 7, is determined as the latest record having the latest committed value of "120". Thereby, the latest record having "120" becomes possible to be referred from the other transactions. The record of "150" indicated by (4-2) in FIG. 7 then becomes "old committed". As a result, after (4) succeeding transaction Tx12 has been committed, the three records including the two records of "100" and "150" and having the state 275 of "old committed", and the record of "120" and having the state 275 of "the latest committed" are stored.

In the above, the update processing unit 22 deletes the record that no longer exists at the point in time when each transaction is committed. Next, a description will be given of a database control method when the update processing unit 22 deletes the record that no longer exists at the point in time when each transaction is rolled back (failed).

Pattern 2-1

Figure 8:
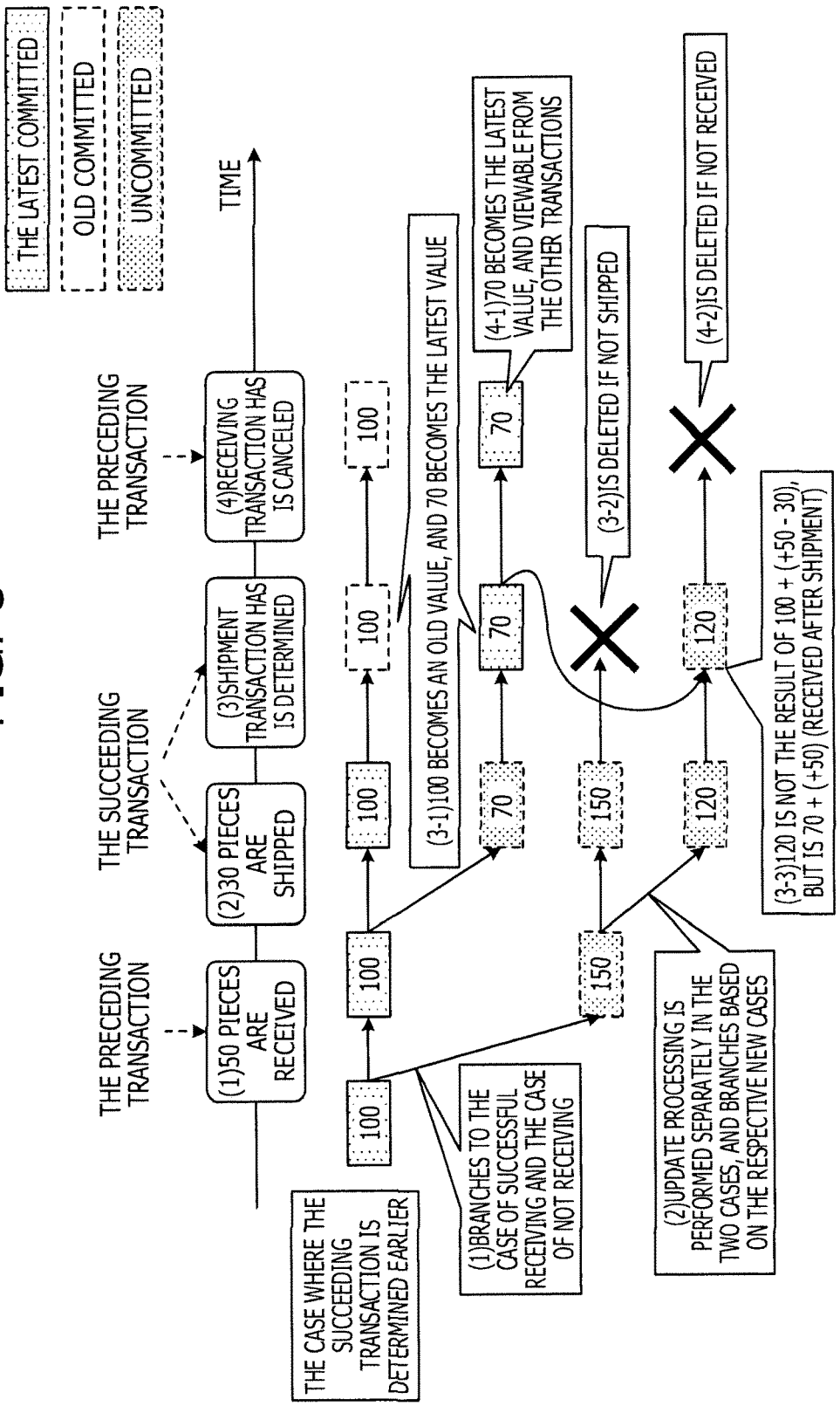
FIG. 8 is a diagram illustrating another example of record states during update processing according to an embodiment.

In the following, a description will be given of the case of the pattern 2-1 in which the succeeding transaction is committed, and then the preceding transaction is rolled back (canceled) with reference to FIG. 8. In the pattern 2-1, transactions are processed by the following procedure. In the pattern 2-1, transactions are processed by the following procedure.
(1) The preceding transaction is executed so that 50 pieces are received
(2) The succeeding transaction is executed so that 30 pieces are shipped
(3) The shipment processing of the succeeding transaction is committed
(4) The reception processing of the preceding transaction is rolled back (canceled)

The procedures (1) to (3) in the pattern 2-1 are the same as the procedures (1) to (3) in the pattern 1-1. Accordingly, the records stored in the database 27 when (3) in FIG. 8, that is to say, the shipment processing of the succeeding transaction is committed are the same as those of the case of the pattern 1-1.

The procedure of (4) in the pattern 2-1 is different from the commitment of the reception processing in the pattern 1-1 illustrated in FIG. 5, and is the rollback of the reception processing. At this time, the record of "70" illustrated by (4-1) in FIG. 8 is determined as the latest record. Thereby, it becomes possible for the latest record having "70" to be referred to from the other transactions. The record of "120" illustrated by (4-2) in FIG. 8 then is a record that no longer exists, and thus is deleted. At this point in time, after (4) the preceding transaction is rolled back, two records, that is to say, the record of "100" having the state 275 of "old committed", illustrated by (4) in FIG. 8, and the record of "70" having the state 275 of "the latest committed" are stored.

Pattern 2-2

Figure 9:
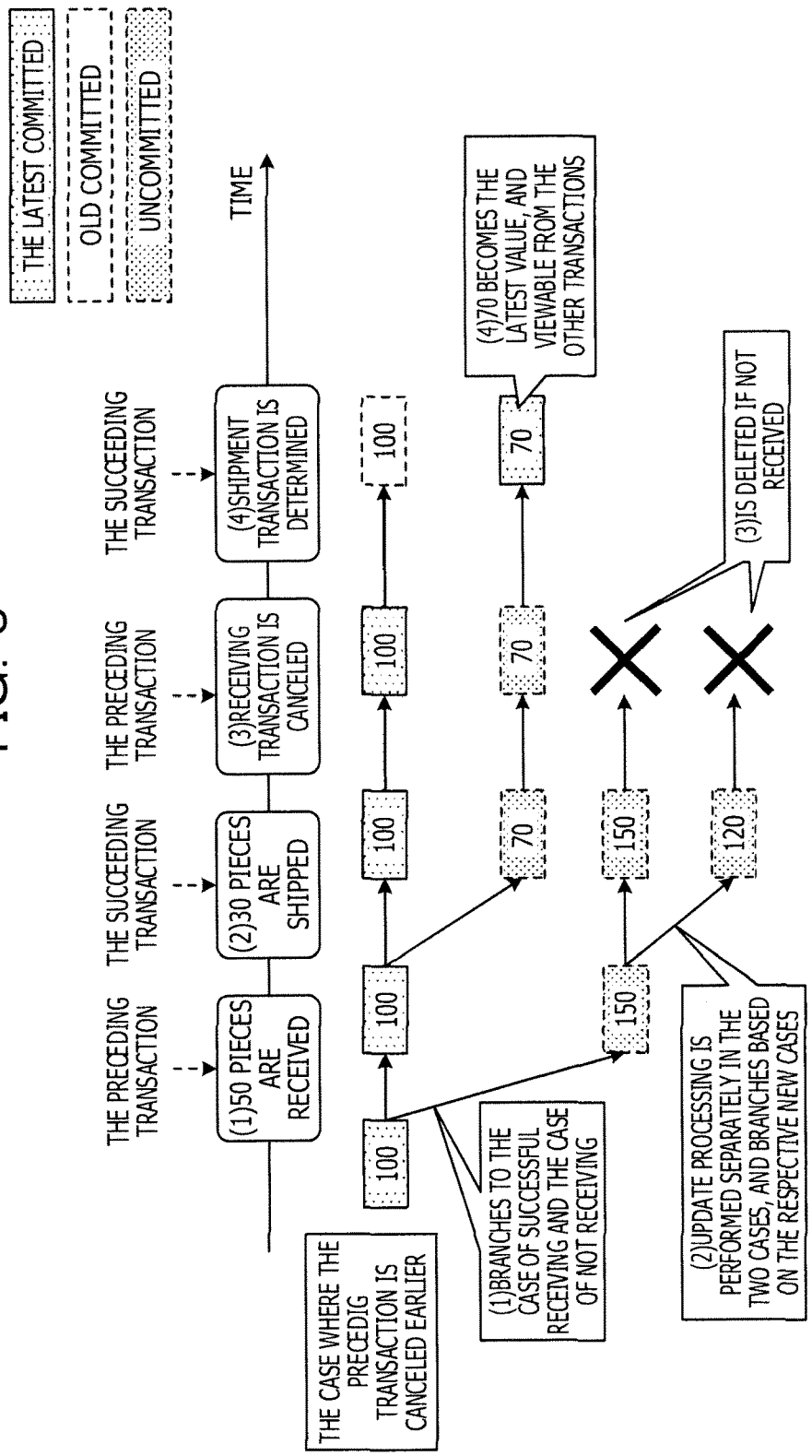
FIG. 9 is a diagram illustrating another example of record states during update processing according to an embodiment.

Next, a description will be given of the case of the pattern 2-2 in which the preceding transaction is rolled back, and then the succeeding transaction is committed with reference to FIG. 9. In the pattern 2-2, the transactions are processed by the following procedure.
(1) The preceding transaction is executed so that 50 pieces are received
(2) The succeeding transaction is executed so that 30 pieces are shipped
(3) The reception processing of the preceding transaction is rolled back
(4) The shipment processing of the succeeding transaction is committed The procedures of (1), (2), and (4) in the pattern 2-2 are the same as the procedures of (1), (2), and (4) in the pattern 1-2 illustrated in FIG. 7. The procedure of (3) in the pattern 2-2 is different from the commitment of the reception processing in the pattern 1-2, and is the rollback of the reception processing. At this time, the records of "120" and "150" illustrated by (3) in FIG. 9 are the records that no longer exist, and are deleted. When the shipment processing of the succeeding transaction then is committed by (4) in the pattern 2-2, the two records, that is to say, the record of "70", which is illustrated by (4) in FIG. 9 and is "the latest committed" record, and the record of "100", which is "old committed", are stored in the database 27.

Pattern 3-1

Figure 10:
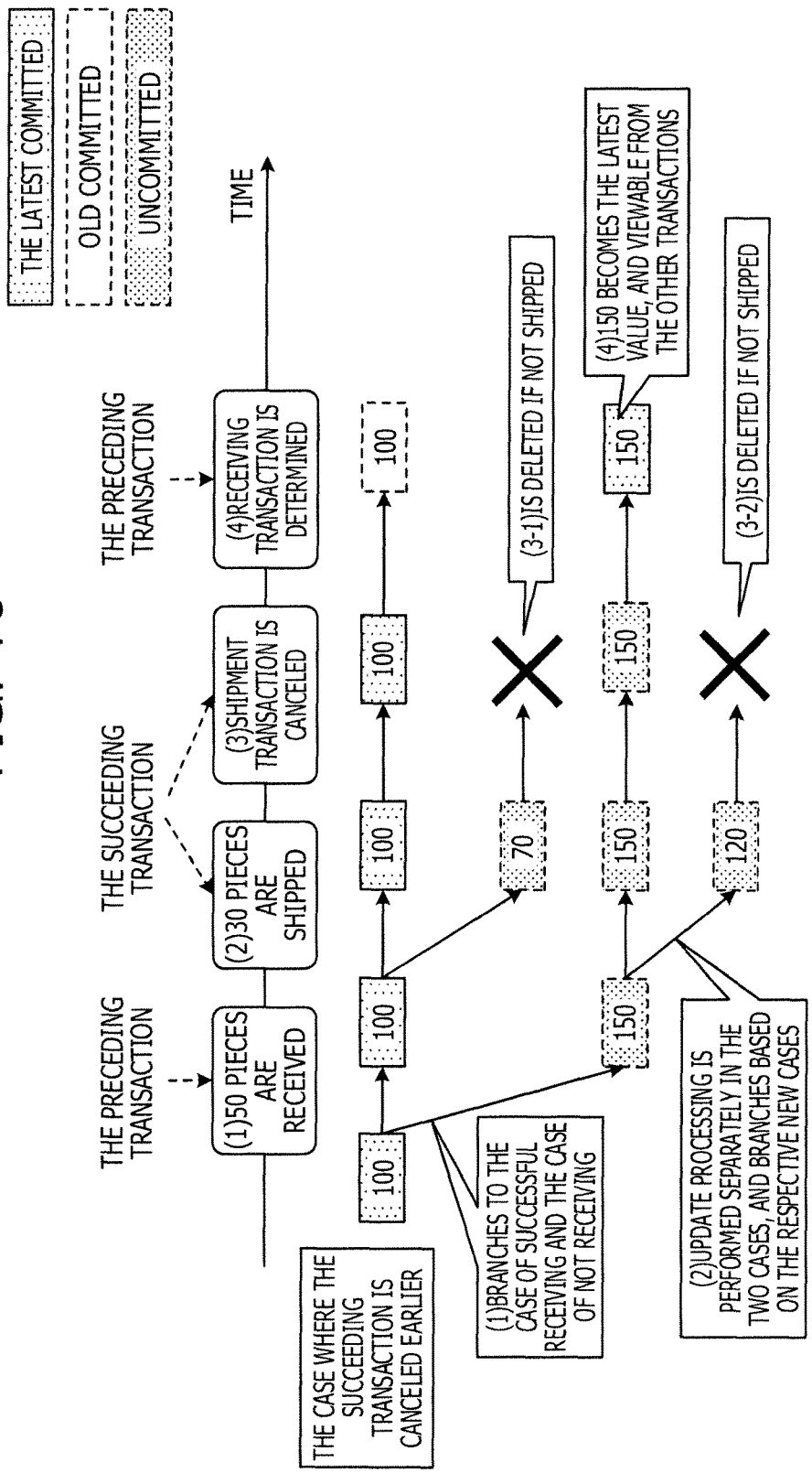
FIG. 10 is a diagram illustrating another example of record states during update processing according to an embodiment.

Following, a description will be given of the case of the pattern 3-1 in which the succeeding transaction is rolled back, and then the preceding transaction is committed with reference to FIG. 10. In the pattern 3-1, transactions are processed by the following procedure.

(1) The preceding transaction is executed so that 50 pieces are received
(2) The succeeding transaction is executed so that 30 pieces are shipped
(3) The shipment processing of the succeeding transaction is rolled back
(4) The reception processing of the preceding transaction is committed The procedures of (1), (2), and (4) in the pattern 3-1 are the same as the procedures of (1), (2), and (4) in the pattern 1-1 illustrated in FIG. 5. The procedure of (3) in the pattern 3-1 is different from the commitment of the shipment processing in the pattern 1-1, and is rollback of the shipment processing. At this time, the records of "70" and "120" illustrated by (3-1) and (3-2) in FIG. 10, respectively are the records that no longer exist, and thus are deleted. When the reception processing of the preceding transaction by (4) in the pattern 3-1 is then committed, the two records, that is to say, the record of "150" illustrated by (4) in FIG. 10, which becomes "the latest committed", and the record of "100" having the state 275 of "old committed" are stored in the database 27.

Pattern 3-2

Figure 11:
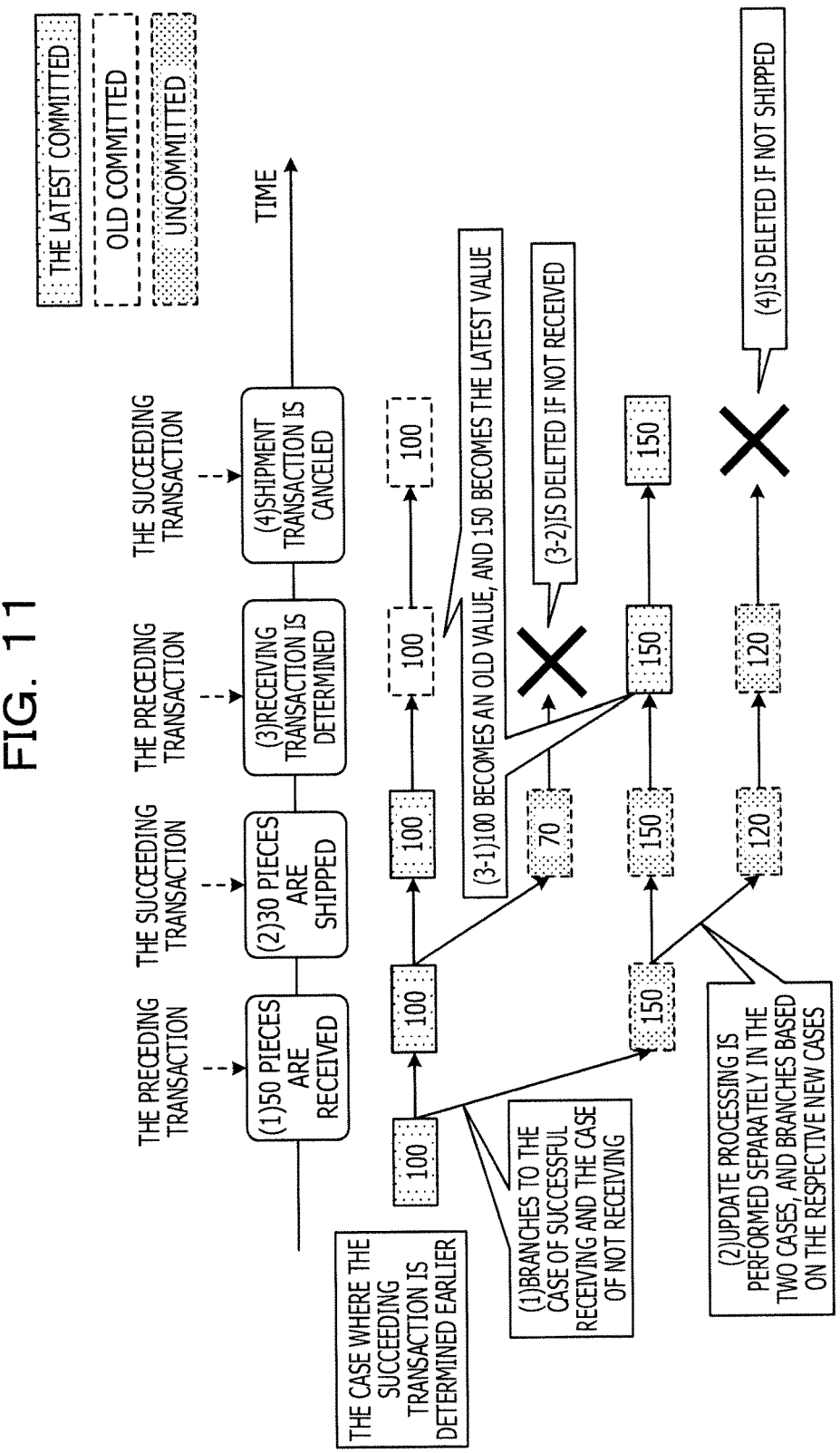
FIG. 11 is a diagram illustrating another example of record states during update processing according to an embodiment.

Next, a description will be given of the case of the pattern 3-2 in which the preceding transaction is committed, and then the succeeding transaction is rolled back with reference to FIG. 11. In the pattern 3-2, the transactions are processed by the following procedure.

(1) The preceding transaction is executed so that 50 pieces are received
(2) The succeeding transaction is executed so that 30 pieces are shipped
(3) The reception processing of the preceding transaction is committed
(4) The shipment processing of the succeeding transaction is rolled back The procedures of (1) to (3) in the pattern 3-2 are the same as the procedures of (1) to (3) in the pattern 1-2 illustrated in FIG. 7. The procedure of (4) in the pattern 3-2 is different from the commitment of the reception processing in the pattern 1-2, and is the rollback of the reception processing. At this time, the record of "120" illustrated by (4) in FIG. 11 is the record that no longer exists, and thus is deleted. Accordingly, the two records, that is to say, the record of "100" having the state 275 of "old committed", and the record of "150" having the state 275 of "the latest committed" are stored in the database 27.

As described above, with a database control method and an update method according to the present embodiment, for a record to which the preceding update processing has occurred, before the update processing is committed, new update processing is performed each time the succeeding new update processing occurs. The new update processing is performed to both the record having an item value of a numeric value in the case of having been updated and the record having an item value of a numeric value in the case of not having been updated. Thereby, before the preceding transaction is committed, it is possible to execute update processing of the succeeding transaction. That is to say, it is possible to execute update processing of the preceding transaction and the succeeding transaction at the same time while guaranteeing the consistency of the data stored in the database 27.

In this regard, in the above description of each of the patterns, descriptions have been given of examples of the update processing of the two transactions having a preceding and succeeding relationship. However, the update processing according to the present embodiment is not limited to the update processing of the two transactions having a preceding and succeeding relationship, and is applicable to the other transactions.

For example, for a record to which the preceding update processing has occurred, before the update processing is committed, each time the succeeding new update processing occurs, the new update processing is performed to a record having an updated numeric value, and a record having a numeric value not updated. Thereby, it is possible to execute update processing of three or more transactions having a preceding and succeeding relationship at the same time.

Example of Hardware Configuration

Figure 12:
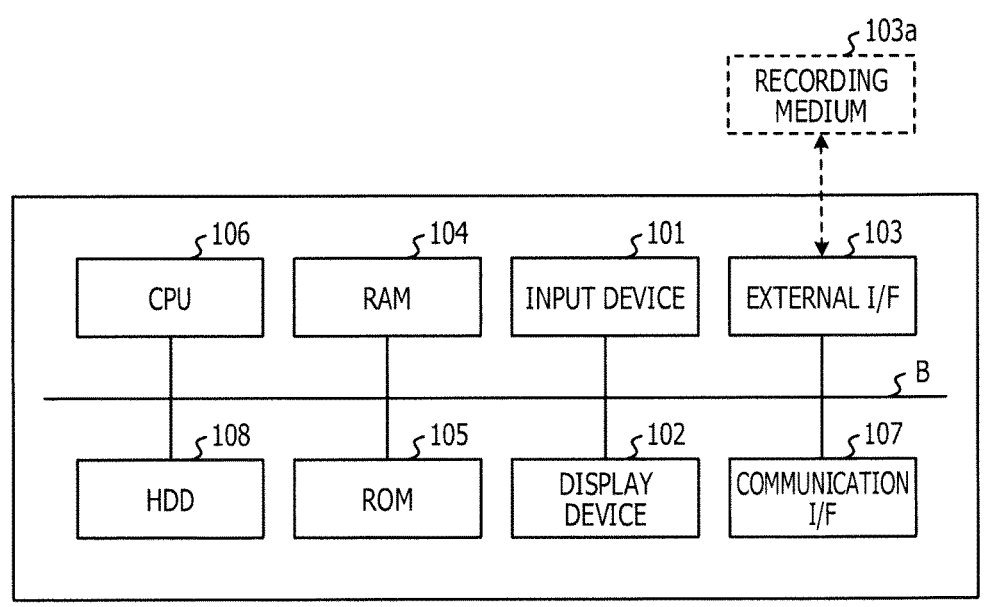
FIG. 12 is a diagram illustrating an example of a hardware configuration of a database server according to an embodiment.

Lastly, a description will be given of a hardware configuration of a database server 20 according to the present embodiment with reference to FIG. 12. The database server 20 includes an input device 101, a display device 102, an external I/F 103, a random access memory (RAM) 104, a read only memory (ROM) 105, a central processing unit (CPU) 106, a communication I/F 107, a hard disk drive (HDD) 108, and the like, and each device is mutually coupled via a bus B.

The input device 101 includes a keyboard, a mouse, and the like, and is used for inputting each operation signal to the database server 20. The display device 102 includes a display, or the like, and displays various processing results. The communication I/F 107 is an interface for coupling the database server 20 to a network. Thereby, it is possible for the database server 20 to perform data communication with a user terminal 10 via the communication I/F 107.

The HDD 108 is a nonvolatile storage device that stores programs and data. The programs and the data that are stored include basic software that controls the entire database server 20 and application software. For example, the HDD 108 may store various kinds of database, programs, and the like.

The external I/F 103 is an interface with an external device. The external device includes a recording medium 103a, or the like. Thereby, it is possible for the database server 20 to read data from and/or write data to the recording medium 103a via the external I/F 103. The recording medium 103a includes a compact disk (CD), a digital versatile disk (DVD), an SD memory card, a universal serial bus (USB) memory, and the like.

The ROM 105 is a nonvolatile semiconductor memory (storage device) capable of holding internal data when the power is turned off. The ROM 105 stores programs for network setting, and the like and data. The RAM 104 is a volatile semiconductor memory (storage device) that temporarily holds the programs and data. The CPU 106 is a processor that reads programs and data from the above-described storage device (for example, "HDD 108", "ROM 105", or the like) to the RAM 104, and performs processing so as control the entire device and actualize mounted functions.

With such a configuration, in the database server 20 according to the present embodiment, the CPU 106 executes update processing using the data and the update processing program 28 in the database 27 stored in the ROM 105 or the HDD 108. The update processing program 28 is an example of a database control program. In this regard, it is possible to store the information stored in the database 27 into a server, or the like in a cloud to which the database server 20 is coupled via the RAM 104, the HDD 108, or the network.

In the above, descriptions have been given of a database control program, a database control method, and a database control device by the above-described embodiments. However, a database control program, a database control method, and a database control device according to the present disclosure are not limited to the above-described embodiments. It is possible to make various variations and improvements within the spirit and scope of the present disclosure. Also, if there are a plurality of the above-described embodiments and the variations, it is possible to make a combination thereof in a range that does not result in contradiction.

In this regard, the data to be stored in the database 27 and to become an update target of the present disclosure are not limited to numeric values, and may be character data, a flag indicating a predetermined status, binary data, or the like. Also, the records that become unwanted by commitment of transactions are periodically deleted.

Also, in the present disclosure, after a transaction of reception processing is executed, if a transaction that refers to a value after the reception processing is executed, it is difficult to process the preceding and the succeeding transactions in parallel. Also, after a transaction of shipment processing is executed, if a transaction that refers to a value after the shipment processing is executed, it is difficult to process the preceding and the succeeding transactions in parallel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a database control program that causes a computer to execute a process, the process comprising:
   when a first update processing for a data item among a plurality of data items included in a target record including the plurality of data items stored in a database starts, generating a first record and a second record, the first record including the data item having a first value, the second record including the data item having a second value by updating the first value; and
   when a second update processing for the target record starts before the first update processing is committed, updating at least one data item in both of the first record and the second record.

2. The database control program according to claim 1, the process further comprises:
   when the first update processing is committed after the second update processing starts, deleting the first record which has been updated by the second update processing,
   when the first update processing is canceled after the second update processing starts, deleting the second record which has been updated by the second update processing.

3. The database control program according to claim 1,
   wherein the updating in the second update processing further includes generating a third record, a fourth record, a fifth record and a sixth record, the third record including the data item having the first value, the fourth record including the data item having the second value, the fifth record including the data item having a third value by updating the first value, the sixth record including the data item having a fourth value by updating the second value.

4. A method by a computer to control a database, the method comprising:
   when a first update processing for a data item among a plurality of data items included in a target record including the plurality of data items stored in a database starts, generating a first record and a second record, the first record including the data item having a first value, the second record including the data item having a second value by updating the first value; and
   when a second update processing for the target record starts before the first update processing is committed, updating at least one data item in both of the first record and the second record.

5. The method of controlling a database, according to claim 4, wherein the method further comprises:
   when the first update processing is committed after the second update processing starts, deleting the first record which has been updated by the second update processing,
   when the first update processing is canceled after the second update processing starts, deleting the second record which has been updated by the second update processing.

6. The method of controlling a database, according to claim 4,
   wherein the updating in the second update processing further includes generating a third record, a fourth record, a fifth record and a sixth record, the third record including the data item having the first value, the fourth record including the data item having the second value, the fifth record including the data item having a third value updated by updating the first value, the sixth record including the data item having a fourth value by updating the second value.

7. A database control device comprising:
   a memory; and
   a processor coupled to the memory and the processor configured to:
      when a first update processing for a data item among a plurality of data items included in a target record including the plurality of data items stored in a database starts, generate a first record and a second record, the first record including the data item having a first value, the second record including the data item having a second value by updating the first value; and when a second update processing for the target record starts before the first update processing is committed, updating at least one data item in both of the first record and the second record.

8. The database control device according to claim 7, further the processor is further configured to:

when the first update processing is committed after the second update processing starts, delete the first record which has been updated by the second updating processing, when the first update processing is canceled after the second update processing starts, deleting the second record which has been updated by the second update processing.

9. The database control device according to claim 7, wherein the updating in the second update processing further includes generating a third record, a fourth record, a fifth record and a sixth record, the third record including the data item having the first value, the fourth record including the data item having the second value, the fifth record including the data item having a third value by updating the first value, the sixth record including the data item having a fourth value by updating the second value.

* * * * *